United States Patent [19]

Soshi

[11] Patent Number: 5,266,982
[45] Date of Patent: Nov. 30, 1993

[54] AUTOMATIC FOCUSING CAMERA WITH AUTOMATIC MANUAL OVERRIDE

[75] Inventor: Isao Soshi, Tokyo, Japan

[73] Assignee: Asahi Kogaku Kogyo Kabushiki Kaisha, Tokyo, Japan

[21] Appl. No.: 846,378

[22] Filed: Mar. 6, 1992

[30] Foreign Application Priority Data

Mar. 11, 1991 [JP] Japan ............................ 3-039270[U]

[51] Int. Cl.⁵ .............................................. C03B 13/36
[52] U.S. Cl. .................................................... 354/400
[58] Field of Search ................. 354/400, 402, 195.1, 354/286

[56] References Cited

U.S. PATENT DOCUMENTS 4,985,723 1/1991 Egawa et al. ................. 354/400

Primary Examiner—W. B. Perkey
Attorney, Agent, or Firm—Kane, Dalsimer, Sullivan, Kurucz, Levy, Eisele and Richard

[57] ABSTRACT

An automatic focusing camera having a lens driving mechanism in a camera body and being driven in accordance with AF data, a focus adjusting mechanism for driving a focus adjusting lens, a drive transmitting device for transmitting the operation of the lens driving mechanism to the focus adjusting mechanism, an automatic focus judging device for judging whether the automatic focusing can be effected in accordance with the AF data, and a disconnecting device for breaking an operative connection between the lens driving mechanism and the focus adjusting mechanism when the automatic focus judging device judges that automatic focusing can not be effected.

19 Claims, 5 Drawing Sheets

AUTOMATIC FOCUSING CAMERA WITH AUTOMATIC MANUAL OVERRIDE

BACKGROUND OF THE INVENTION

1. Field of the Invention

The present invention relates to an automatic focusing camera, particularly, an autofocus camera in which a lens driving system is actuated in accordance with AF (auto focus) data to move a focus adjusting lens through a drive transmitting means to thereby effect the focus adjustment.

2. Description of Related Art

Generally speaking, in a known automatic focusing camera having an AF function, a focus adjusting lens of a taking lens assembly is moved in the optical axis direction thereof by a lens driving system provided in a camera body to control the focus. If the taking lens assembly is an interchangeable lens of a single lens reflex camera, a joint shaft (body joint shaft) which projects from a body mount of the camera body and which is rotated by the lens driving system is engaged by a joint shaft (lens joint shaft) provided on a lens mount of the interchangeable lens to transmit the rotational force.

There are two AF data detecting systems, i.e., an active system in which measuring light is emitted toward an object to be taken, and a passive system in which light transmitted through the taking lens is used to detect the AF data. In a known passive type automatic focusing camera, automatic focusing can not be effected when the object to be taken is dark or when an object contrast can not be detected. In such a case, a photographer actuates a manual switch to disconnect the body joint shaft from the lens joint shaft, so that a focus adjusting ring can be manually rotated to control the focus.

It is necessary for a photographer to shift the position in which he or she holds the camera upon actuating the manual switch and then return the camera to its original position in which a picture is to be taken after the switching operation of the manual switch is completed. However, it is difficult for the photographer to reproduce the same composition after returning the camera to its original position. In particular, in the case of a moving object, the photographer may miss a shutter chance.

SUMMARY OF THE INVENTION

The primary object of the present invention is to provide an automatic focusing camera in which the autofocus mode can be easily switched to a manual focus mode.

To achieve the object mentioned above, according to the present invention, there is provided an automatic focusing camera comprising a lens driving mechanism in a camera body which is driven in accordance with AF data, a focus adjusting mechanism for driving a focus adjusting lens, a drive transmitting means for transmitting the operation of the lens driving mechanism to the focus adjusting mechanism, an automatic focus judging means for judging whether the automatic focusing can be effected in accordance with the AF data, and a disconnecting means for breaking an operative connection between the lens driving mechanism and the focus adjusting lens when the automatic focus judging means judges that automatic focusing can not be effected.

According to another aspect of the present invention, the provision is made to an automatic focusing camera having a camera body with a body mount and an interchangeable lens With a lens mount which can be connected to the body mount, comprising a body joint shaft provided on the body mount of the camera body so as to retractably project therefrom, a rotation drive means for driving the body joint shaft, a lens joint shaft provided on the lens mount of the interchangeable lens and engaged by the body joint shaft to be rotated thereby, a motor driven retracting mechanism for moving the body joint shaft to a disconnection position in which the body joint shaft is disengaged from the lens joint shaft, and a controller for controlling the motor driven retracting mechanism.

According to still another aspect of the present invention, there is provided an automatic focusing single lens reflex camera having a camera body with a body mount and an interchangeable lens with a lens mount which can be connected to the body mount, comprising a body joint shaft provided on the body mount of the camera body so as to retractably project therefrom, a rotation drive means for driving the body joint shaft, a lens joint shaft provided on the lens mount of the interchangeable lens and engaged by the body joint shaft to be rotated thereby, and a joint position detecting means for detecting that the body joint shaft is engaged by or disengaged from the lens joint shaft.

The present disclosure relates to subject matter contained in Japanese utility model application No. 3-39270 (filed on Mar. 11, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 5:
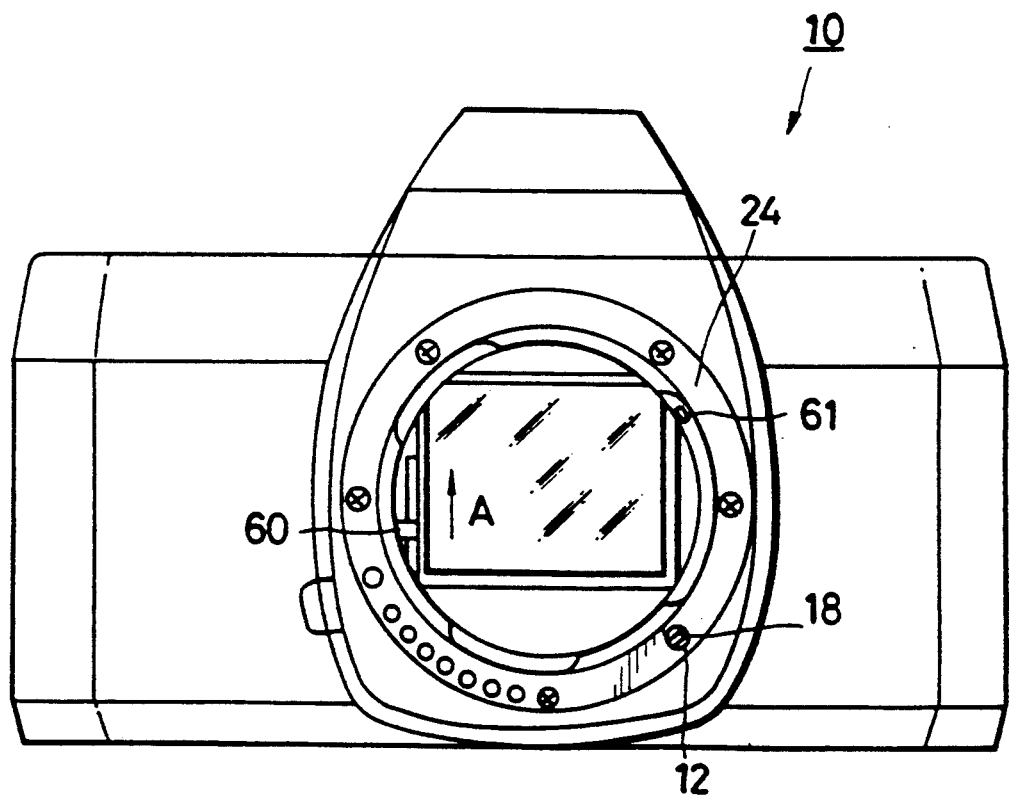
FIG. 5 is a front elevational view of an AF single lens reflex camera body according to the present invention.

Camera body 10 is a passive type single lens reflex camera to which the present invention is applied. A body joint shaft 12 projects from an insertion hole 18 formed in a body mount 24 of the camera body 10, as can be seen in FIGS. 2 and 5. A diaphragm driving member 60 and a diaphragm value reading projection 61 are provided on the inner periphery of the body mount 24. In the illustrated single lens reflex camera, when a shutter button 64 (FIG. 1) is depressed by a first step (half step), a photometering switch is turned ON to begin the detection of object brightness and object distance. When the shutter button 64 is depressed by a second step (full step), a release switch is turned ON to release the shutter.

Figure 4:
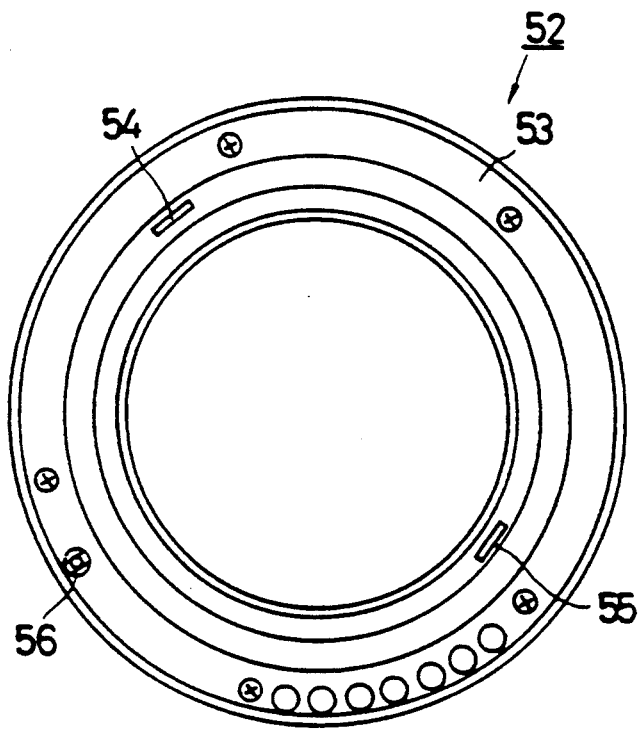
FIG. 4 is a back view of an interchangeable lens.

FIG. 4 shows a back view of an interchangeable lens 52. A lens mount 53 has an automatic diaphragm member 55 which is engaged and actuated by the diaphragm driving member 60 when the interchangeable lens 52 is mounted to the camera body 10, a diaphragm value transmitting projection 54 which is rotated together with a diaphragm value setting ring of the interchangeable lens and is engaged by the diaphragm value reading projection 61 when the interchangeable lens 52 is mounted to the camera body 10, and a focus adjusting joint (lens joint shaft) 56 which is engaged by the body joint shaft 12 when the interchangeable lens 52 is mounted to the camera body 10.

When the shutter button 64 is depressed by a full step, the diaphragm driving member 60 is moved in the direction A in FIG. 5 before the shutter is released, so that the automatic diaphragm member 55 is moved in the same direction to actuate a diaphragm mechanism within the interchangeable lens 52 to thereby obtain a predetermined diaphragm value.

The diaphragm value reading projection 61 reads the diaphragm value in accordance with the angular position of the diaphragm value transmitting projection 54 which is rotated together with the diaphragm value setting ring. The interchangeable lens 52 has a focus adjusting lens 67 and a lens ROM 66 having inherent lens data of the interchangeable lens stored therein. The focus adjusting lens 67 is connected to the focus adjusting joint 56 through a focus adjusting mechanism 88, as shown in FIG. 1

Figure 1:
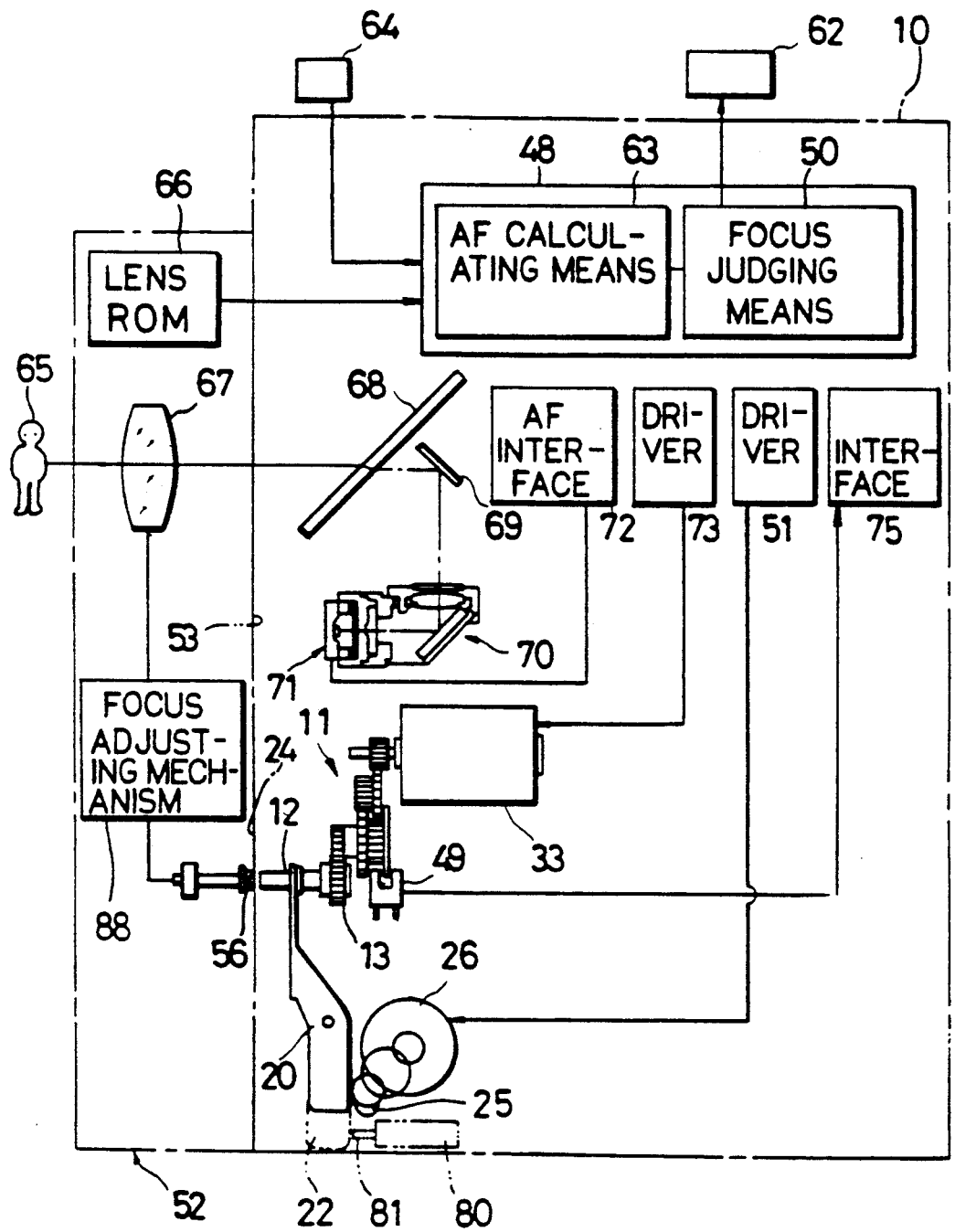
FIG. 1 is a block diagram of an automatic focusing system of an AF single lens reflex camera according to the present invention.
Figure 2:
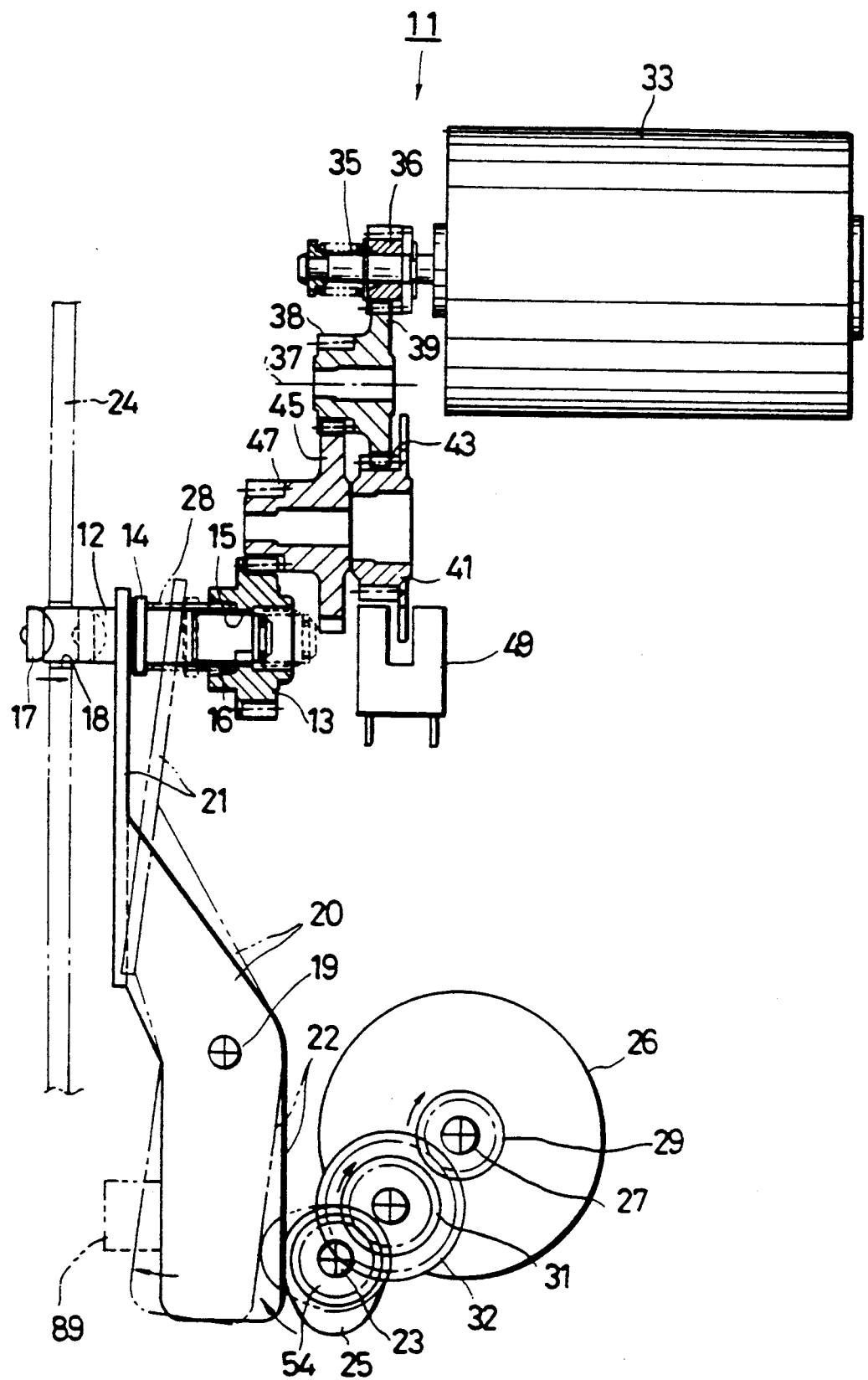
FIG. 2 is a side elevational view of a lens driving system of an AF single lens reflex camera according to the present invention.

FIGS. 1 and 2 show a control system and a lens driving system in a single lens reflex camera according to the present invention.

The lens data output from the lens ROM 66, provided in the interchangeable lens 52, and the ON/OFF data of the photometering switch and the release switch associated with the operation of the shutter button 64 are input to a controller 48 provided in the camera body 10. The controller 48 includes an object distance calculating means (AF calculating means) 63 and a focus judging means 50. The controller 48 is connected to an LCD (Liquid Crystal Display) 62 which indicates the focus (AF) state and the exposure (AE) data.

The camera body 10 includes a main mirror 68, an auxiliary mirror 69, an AF sensor module optical system 70 and a CCD line sensor 71. The CCD line sensor 71 is connected to an AF calculating means 63 of the controller 48 through an AF interface 72.

The body joint shaft 12 which is retractably inserted in the insertion hole 18 of the body mount 24 has a flange 14 at the center thereof, an engaging projection 17 at the front end, and a spline 16 at the rear end, respectively. The body joint shaft 12 is provided on the rear end thereof with a drive gear 13 which has a key way 15 formed in the shaft portion thereof, so that the spline 16 can be engaged in the key way 15. An AF drive motor 33 having a rotational shaft 35 extending substantially in parallel with the optical axis is connected to the controller 48 through a driver 73. The rotation of the AF drive motor 33 is transmitted to the drive gear 13 through a drive pinion 36, which is secured to the rotational shaft 35, and transmission gears 39 and 45. The transmission gear 39 which engages with the drive pinion 36 has a small diameter gear 38 which is in mesh with the transmission gear 45. A toothed interrupter (gear) 41 coaxial to the transmission gear 45 constitutes an encoder which intermittently intercepts a light path of a photocoupler 49 to output pulse signals. The pulse signals of the encoder are input to the controller 48 through the interface 75. The interrupter 41 has a small diameter gear 43 integral therewith, which is in mesh with the transmission gear 39. The transmission gear 45 has a small diameter gear 47 integral therewith, which is in mesh with the drive gear 13.

The camera body 10 has a joint retracting lever 20 which is rotatable about an axis of a supporting shaft 19. When the joint retracting lever 20 rotates in the clockwise direction in FIGS. 1 and 2, an abutment 21 provided at one end thereof forces the flange 14 of the body joint shaft 12 against the bias of a spring 28 provided around the body joint shaft 12 to retract the engaging projection 17 into the body mount 24. A cam member 25 which is secured to a rotational shaft 23 and rotatably supported by the camera body 10 is in contact with an abutting portion 22 formed at the other end of the joint retracting lever 20, so that when the rotating cam member exerts a force against the abutting portion 22, the joint retracting lever 20 is rotated in the clockwise direction. Further rotation of the cam member 25 causes the force exerted against the abutting portion 22 of the joint retracting lever 20 to be relieved. The joint retracting lever 20 is then rotated in the counterclockwise direction by the force of the spring 28 through the flange 14. A joint retracting lever detecting switch 89 (FIG. 2) which is turned ON and OFF in accordance with the rotation of the joint retracting lever 20 is provided in the vicinity of the latter, so that the retraction of the body joint shaft 12 can be determined by the joint retracting lever detecting switch 89.

An AF retracting motor 26 has a rotational shaft 27 in parallel with the rotational shaft 23 of the cam member 25. The rotation of the AF retracting motor 26 is transmitted to a cam rotating gear 54 secured to the rotational shaft 23 of the cam member 25 through a pinion 29 mounted to the rotational shaft 27, a large diameter gear 32 engaging the pinion 29, and a small diameter gear 31 coaxial to the large diameter gear 32 which engages cam rotating gear 54. The AF retracting motor 26 is connected to the focus judging means 50 of the controller 48 through a driver 51. The AF retracting motor 26, the pinion 29, the large diameter gear 32, the small diameter gear 31, the cam rotating gear 54, the cam member 25, and the joint retracting lever 20 constitute an association switching means.

Figure 3A:
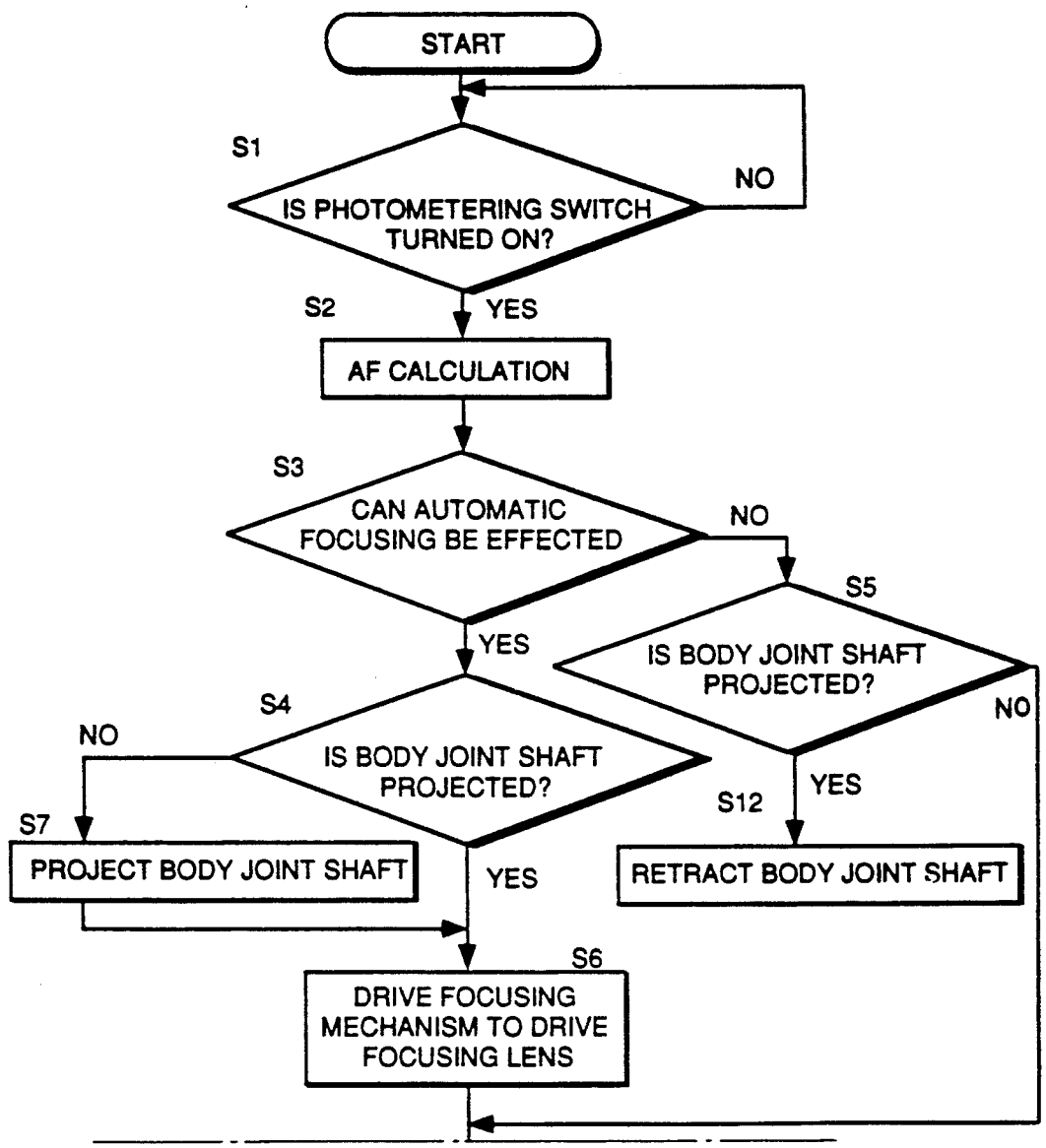
FIGS. 3A and 3B are flow charts of picture taking operations of an AF single lens reflex camera according to the present invention.
Figure 3B:
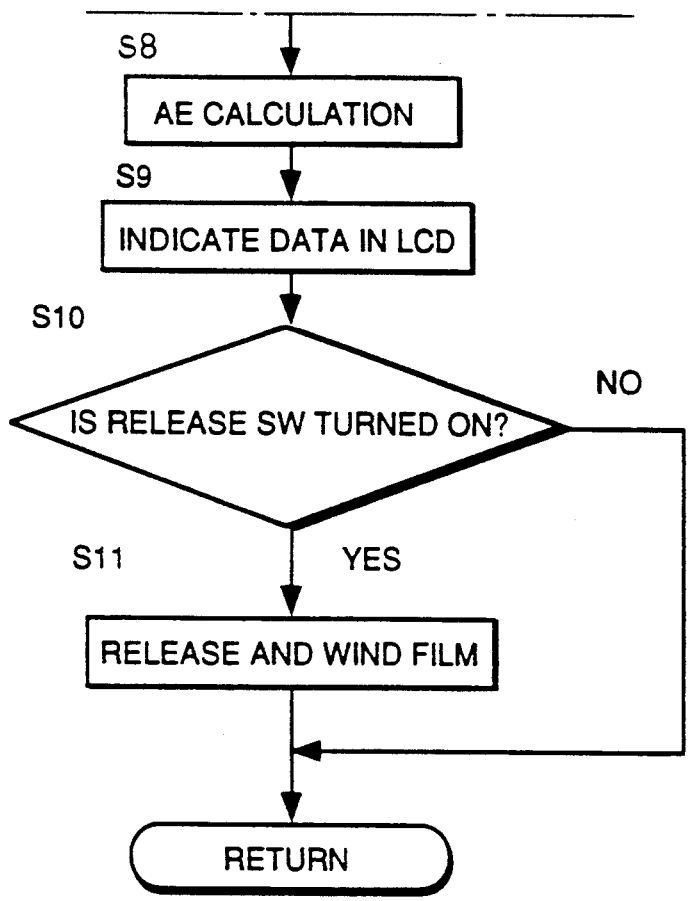

The picture taking operation of the AF single lens reflex camera as constructed above is as follows (FIG. 3).

When a back cover of the camera is closed and a main switch (not shown) is turned ON, the inherent lens data including data necessary for effecting the automatic focusing is output from the lens ROM 66 to the controller 48. When the camera is pointed toward an object 65 (FIG. 1) to be taken, an image of the object is formed on the CCD line sensor 71 through the taking lens 67 of the interchangeable lens 52, the main mirror 68, the auxiliary mirror 69, and the AF sensor module optical system 70. In this position, when the shutter button 64 is depressed by a half step to turn the photometering switch ON, the object image data in accordance with the formation of the image is input to the controller 48 through the AF interface 72, so that the AF calculating means 63 commences the AF calculation (steps S1 and S2). As is well known, the AF data including the amount of defocus (out of focus) is calculated in accordance with the input object image data by an AF calculation means, so that the necessary displacement of the lens can be determined in advance in accordance with the amount of defocus and the inherent lens data.

At step S3, whether or not the automatic focusing can be effected is checked by the focus judging means 50 in accordance with the calculation results (AF data) of the AF calculating means 63. The judgement of the possibility of automatic focusing can be carried out, for example, by using the data of a known TTL phase-matching system to determine an appropriate waveshape level of the data.

If it is judged that the automatic focusing can be effected at step S3, whether or not the body joint shaft 12 has been projected is checked by the joint retraction detecting switch 89 at step S4.

If the body joint shaft 12 is projected at step S4, the AF drive motor 33 is actuated to rotate the body joint shaft 12 through the drive pinion 36, the transmission gears 39 and 45, and the drive gear 13. As a result, the focus adjusting lens 67 is moved in the optical axis direction through the focus adjusting joint 56 and the focus adjusting mechanism 88 (step S6). Thereafter, the AE calculation is carried out (step S8), so that the AE data is indicated together with the AF data in the LCD 62 (step S9). Thereafter, whether the release switch is turned ON is checked at step S10. When the shutter button 64 is depressed by a full step, the release switch is turned ON and the shutter is released. After that, a film winding mechanism (not shown) winds the film by one frame at step S11.

If the object brightness or contrast is too little to effect the automatic focus calculation, the focus judging means 50 judges that it is impossible to effect the automatic focusing at step S3. Thereafter, whether or not the body joint shaft 12 is projected is checked by the joint retraction detecting switch 89 at step S5. If the body joint shaft 12 is not projected, the control proceeds to step S8. Conversely, if the body joint shaft 12 is projected at step S5, the control proceeds to step S12 at which point the focus judging means 50 outputs the drive signal through the driver 51 to rotate the AF retracting motor 26 by a predetermined angular displacement. As a result, the cam member 25 is rotated to a position shown by a phantom line in FIG. 2 through the pinion 29, the large diameter gear 32, the small diameter gear 31, and the body mount 24.

Consequently, the joint retracting lever 20 is rotated at the abutting portion 22 thereof in the clockwise direction by the cam member 25. As a result, the abutment 21 of the joint retracting lever 20 pushes the flange 14 of the body joint shaft 12 in the rightward direction in FIG. 2, so that the body joint shaft 12 is forced into the drive gear 13 against the spring 28, and the front end 17 of the body joint shaft 12 is retracted into the body mount 24. This disengages the body joint shaft 12 from the focus adjusting joint 56 (step S12). In this state, the photographer can manually rotate the diaphragm value setting ring of the interchangeable lens 52 to move the focus adjusting lens in the optical axis direction. After the manual focusing operation is completed, control proceeds to step S8.

Although the above-mentioned embodiment has been applied to a passive type single lens reflex camera, the present invention can be applied in a similar manner to an active type single lens reflex camera in which infrared light beams or supersonic waves are emitted toward an object to be photographed, so that the AF calculation is performed to obtain the AF data in accordance with the light reflected by the object.

Furthermore, the motor driven retracting mechanism of the body joint shaft 12 is not limited to that of the above-mentioned embodiment, and can be realized for example by an electromagnetic plunger device 80, as shown in FIG. 1. The electromagnetic plunger device 80 has a plunger 81 which projects to push the abutting portion 22 of the joint retracting lever 20 to thereby disengage the body joint shaft 12 from the lens joint shaft 56 when the electromagnetic plunger device 80 is supplied with electric power.

As can be understood from the above discussion, according to the present invention, if the object is dark or object contrast can not be detected, preventing the automatic focusing from being effected, the operative connection of the lens driving system and the focus adjusting lens by the drive transmitting means is immediately broken thereby switching the automatic focusing mode to the manual focusing mode. Consequently, it is not necessary for the photographer to shift the position in which he or she holds the camera upon switching to the manual focusing mode, thereby significantly reducing the possiblilty of a missed shutter chance.

I claim:

1. An automatic focusing camera comprising;
   means for obtaining AF data based upon image data of an object to be imaged;
   a lens driving mechanism on a camera body which is driven in accordance with AF data;
   a focus adjusting mechanism for driving a focus adjusting lens;
   a drive transmitting means for transmitting the operation of the lens driving mechanism to the focus adjusting mechanism;
   an automatic focus judging means for judging whether or not the automatic focusing can be effected in accordance with the AF data; and,
   a disconnecting means responsive to said automatic focus judging means for automatically breaking an operative connection between the lens driving mechanism and the focus adjusting mechanism when the automatic focus judging means judges that automatic focusing can not be effected before effecting any driving of said focus adjusting lens.

2. An automatic focusing camera according to claim 1, wherein said lens driving mechanism comprises a rotatable body joint shaft provided in the camera body and said focus adjusting mechanism comprises a lens joint shaft which can be engaged by the body joint shaft, said lens joint shaft being rotated by said body shaft to thereby move the focus adjusting lens.

3. An automatic focusing camera according to claim 2, further comprising a biasing means for biasing the body joint shaft toward the lens joint shaft.

4. An automatic focusing camera according to claim 3, wherein said disconnecting means moves the body joint shaft against said biasing means to disconnect it from the lens joint shaft.

5. An automatic focusing camera according to claim 4, wherein said disconnecting means comprises a joint retracting lever rotatable about an axis, an engaging portion provided at a front end of the joint retracting lever to engage the body joint shaft, and an electrical drive means for rotating the joint retracting lever.

6. An automatic focusing camera according to claim 5, wherein said electrical drive means comprises a motor and a cam Which is driven by the motor to engage with the joint retracting lever.

7. An automatic focusing camera according to claim 5, wherein said electrical drive means comprises an electromagnetic plunger device including a plunger which retractably projects to engage with the joint retracting lever when the electromagnetic plunger device is activated.

8. An automatic focusing camera according to claim 1, wherein said automatic focus judging means judges that no automatic focusing can be effected when an object to be taken has a brightness or contrast below a predetermined 9. An automatic focusing camera having a camera body with a body mount and an interchangeable lens with a lens mount which can be connected to the body mount, comprising;
   a body joint shaft provided on the body mount of the camera body so as to retractably project therefrom;
   a rotation drive means for driving the body joint shaft;
   a lens joint shaft provided on the lens mount of the interchangeable lens and engaged by the body joint shaft to be rotated thereby;
   a motor driven retracting mechanism for moving the body joint shaft to a disconnection position in which the body joint shaft is disengaged from the lens joint shaft; and,
   a controller for controlling the motor driven retracting mechanism before attempting to effect any automatic focusing of said camera.

10. An automatic focusing camera according to claim 9, wherein said controller moves the motor driven retracting mechanism in accordance with electrical signals.

11. An automatic focusing camera according to claim 9, further comprising a focus adjusting mechanism which moves a focus adjusting lens of the interchangeable lens.

12. An automatic focusing camera according to claim 11, wherein said lens joint shaft is connected to the focus adjusting mechanism.

13. An automatic focusing camera according to claim 12, wherein said controller comprises a focus judging means for judging whether or not the automatic focusing can be effected by the focus adjusting mechanism in accordance with AF data, so that when the focus judging means judges that automatic focusing can not be effected, the retracting mechanism is actuated.

14. An automatic focusing camera according to claim 10, wherein said retracting mechanism comprises a joint retracting lever rotatable about an axis, an engaging portion provided at a front end of the retracting lever to engage with the body joint shaft, and an electrical drive means for rotating the retracting lever.

15. An automatic focusing camera according to claim 14, wherein said electrical drive means comprises a motor and a cam which is driven by the motor to engage with the joint retracting lever.

16. An automatic focusing camera according to claim 15, wherein said electrical drive means comprises an electromagnetic plunger device having a plunger which retractably projects to engage with the joint retracting lever when the electromagnetic plunger device is activated.

17. An automatic focusing single lens reflex camera having a camera body with a body mount and an interchangeable lens with a lens mount which can be connected to the body mount, comprising;
   means for obtaining AF data based upon image data of an object to be imaged;
   an automatic focus judging means for judging whether or not the automatic focusing can be effected in accordance with the AF data;
   a body joint shaft provided on the body mount of the camera body so as to retractably project therefrom;
   a rotation drive means for driving the body joint shaft;
   a lens joint shaft provided on the lens mount of the interchangeable lens and engaged by the body joint shaft to be rotated thereby;
   a joint position detecting means for detecting if the body joint shaft is engaged by or disengaged from the lens joint shaft; and,
   a disconnecting means responsive to said automatic focus judging means and said joint position detecting means for automatically breaking an operative connection between said body joint shaft and said lens joint shaft before attempting to effect any automatic focusing of said camera.

18. An automatic focusing camera according to claim 17, further comprising a motor driven retracting mechanism for moving the body joint shaft to a disconnection position in which the body joint shaft is disengaged from the lens joint shaft and a controller for controlling the motor driven retracting mechanism.

19. An automatic focusing camera according to claim 18, wherein said controller moves the motor driven retracting mechanism after the joint position detecting means detects that the body joint shaft is engaged by the lens joint shaft.

* * * * *